United States Patent
Miyashita

(10) Patent No.: US 9,503,676 B2
(45) Date of Patent: Nov. 22, 2016

(54) LENS DEVICE AND POSITION DETECTION METHOD OF MOVABLE OPTICAL ELEMENT

(71) Applicant: FUJIFILM Corporation, Tokyo (JP)

(72) Inventor: Mamoru Miyashita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/847,250

(22) Filed: Sep. 8, 2015

(65) Prior Publication Data

US 2015/0381924 A1 Dec. 31, 2015

Related U.S. Application Data

(63) Continuation of application No. PCT/JP2013/081126, filed on Nov. 19, 2013.

(30) Foreign Application Priority Data

Mar. 6, 2013 (JP) .................................. 2013-043994

(51) Int. Cl.
G11B 15/48 (2006.01)
G11B 5/584 (2006.01)
(Continued)

(52) U.S. Cl.
CPC .............. *H04N 5/7826* (2013.01); *G01B 7/30* (2013.01); *G11B 5/00839* (2013.01); *G01D 5/249* (2013.01); *G02B 7/102* (2013.01); *G11B 5/00817* (2013.01)

(58) Field of Classification Search
CPC ....... G11B 15/48; G11B 5/584; G11B 15/18; G11B 17/00; G11B 19/02; G11B 5/02; H04N 5/78

USPC ................ 360/139, 74.2, 74.4, 77.2, 69, 55; 386/314, 315, 316, 320

See application file for complete search history.

(56) References Cited

U.S. PATENT DOCUMENTS 3,706,084 A * 12/1972 Regitz et al. ...... G11B 20/1419
360/42
4,768,119 A * 8/1988 Iijima ..................... H03M 1/06
341/15

(Continued)

FOREIGN PATENT DOCUMENTS

EP 1076338 A2 * 2/2001 ......... G11B 5/59605
JP 04-307327 10/1992

(Continued)

OTHER PUBLICATIONS

International Search Report, PCT/JP2013/081126, Feb. 25, 2014.

*Primary Examiner* — Daquan Zhao
(74) *Attorney, Agent, or Firm* — Young & Thompson

(57) ABSTRACT

In a magnetic recording scale 41 fixed to an outer periphery of a rotary tube 20 which rotates around an optic axis depending on the movement of a zoom lens, a plurality of recording section 41a and recording section 41b pairs are provided in the rotational direction. A recording section 41b has a width less than a width of a recording section 41a. The recording section 41a is recorded with code information indicating a position in the magnetic recording scale 41, and the recording section 41b is recorded with a magnetic signal for detecting the recording section 41a adjacent thereto. A lens position detecting unit 71 detects a position of the zoom lens based on the code information and then detects a position of the zoom lens based on the detected code information.

9 Claims, 10 Drawing Sheets

(51) Int. Cl.
*G11B 15/18* (2006.01)
*G11B 17/00* (2006.01)
*G11B 19/02* (2006.01)
*G11B 5/02* (2006.01)
*H04N 5/7826* (2006.01)
*G01B 7/30* (2006.01)
*G11B 5/008* (2006.01)
*H04N 5/78* (2006.01)
*G01D 5/249* (2006.01)
*G02B 7/10* (2006.01)

(56) References Cited

U.S. PATENT DOCUMENTS

| | | | | |
|---|---|---|---|---|
| 4,774,464 A | * | 9/1988 | Kubota | G01D 5/145 324/207.25 |
| 4,796,104 A | * | 1/1989 | Ito | G11B 5/0086 360/70 |
| 4,851,940 A | * | 7/1989 | Saito | G11B 15/467 360/70 |
| 4,951,162 A | * | 8/1990 | Yoshimura | G11B 21/103 360/18 |
| 4,978,902 A | * | 12/1990 | Hatagami | G11B 5/5547 318/603 |
| 5,051,846 A | * | 9/1991 | Tsushima | H04N 5/7826 360/64 |
| 6,721,487 B1 | * | 4/2004 | Senshu | G11B 5/00878 360/32 |
| 2003/0161221 A1 | * | 8/2003 | Shimazaki | G11B 20/1217 369/13.05 |
| 2004/0027708 A1 | * | 2/2004 | Suzuki | G11B 5/865 360/17 |
| 2010/0091413 A1 | * | 4/2010 | Nunokawa | G11B 5/1278 360/319 |
| 2010/0128382 A1 | * | 5/2010 | Maeda | G11B 5/012 360/75 |
| 2011/0128396 A1 | | 6/2011 | Yano et al. | |
| 2013/0279039 A1 | * | 10/2013 | Shiroishi | G11B 20/1217 360/48 |

FOREIGN PATENT DOCUMENTS

| | | | |
|---|---|---|---|
| JP | 05-99688 | | 4/1993 |
| JP | 2001116861 A | * | 4/2001 |
| JP | 2008-116343 | | 5/2008 |
| JP | 2011-112520 | | 6/2011 |
| WO | WO 2008/056546 | | 5/2008 |

* cited by examiner

LENS DEVICE AND POSITION DETECTION METHOD OF MOVABLE OPTICAL ELEMENT

CROSS REFERENCE TO RELATED APPLICATION

This is a continuation of International Application No. PCT/JP2013/081126 filed on Nov. 19, 2013, and claims priority from Japanese Patent Application No. 2013-043994, filed on Mar. 6, 2013, the entire disclosures of which are incorporated herein by reference.

BACKGROUND

1. Technical Field

The present invention relates to a lens device which is suitable for broadcast or movie and a position detection method of a movable optical element mounted in the lens device.

2. Related Art

Recently, due to the advancement of screen enlargement and definition enhancement in televisions or monitors, a demand on a higher quality of an image to be displayed is increased. In order to satisfy the demand on the higher quality image, a position detector (an encoder) capable of detecting a position with high precision is mounted in a zoom lens for broadcast or movie so as to achieve the high performance of a lens control.

Hitherto, encoders disclosed in Patent Literature 1 (JP-A-4-307327) and Patent Literature 2 (JP-A-5-099688) have been suggested as a compact and low-cost encoder.

In the encoder disclosed in Patent Literature 1, a single track provided on a rotary drum is divided into $2^n$ regions, and in each region, an absolute position code which indicates an absolute position and identification codes provided at both ends of the region so as to identify the region are magnetized. Further, when the identification codes are detected by an MR sensor, the identification codes and the absolute position code detected between the identification codes are adapted to be output.

The encoder disclosed in Patent Literature 2 has a single track provided on a rotary drum and divided into a plurality of regions, and in each region, an absolute position code which indicates an absolute position is magnetized. The absolute position code is subjected to frequency modulation and magnetized such that if the absolute position code is a decimal digit "1," the magnetization frequency is 100 Hz; if the absolute position code is a decimal digit "0," the magnetization frequency is 50 Hz; and if the absolute position code is a decimal digit "2," the magnetization frequency is 150 Hz.

In the encoder disclosed in Patent Literature 2, no consideration is given as to how to detect a start position of the absolute position code.

Meanwhile, according to the encoder disclosed in Patent Literature 1, since the identification codes exist, the start position of the absolute position code may be readily detected.

However, in the encoder disclosed in Patent Literature 1, it is necessary to provide a non-magnetized region at least by the absolute position code between identification codes of different regions. For this reason, after the position of a certain region is detected, it is necessary to rotate the rotary drum at least by one region until a region adjacent to the certain region is detected.

For this reason, when the encoder disclosed in Patent Literature 1 is applied to a lens device, since it is necessary for a user to rotate a lens barrel greatly, for example, until a lens position is detected after power is turned on. Thus, use convenience is deteriorated.

Further, since a single absolute position is detected from a region corresponding to two absolute position codes, it is difficult to increase the number of divided regions in a single track. In a lens device, in particular, in a business purpose lens device or the like, the rotational position of the lens should be finely detected. Thus, an application to the lens device is difficult in the technique of Patent Literature 1.

SUMMARY OF INVENTION

In view of the foregoing circumstance, illustrative aspects of the present invention are to provide a lens device capable of precisely detecting an absolute position of a movable optical element with a low-cost and simple configuration, and a position detection method of a movable optical element.

An aspect of the present invention provides a lens device having a movable optical element, the lens device including: a rotary member configured to rotate around an optic axis of the movable optical element depending on a movement of the movable optical element; a first magnetic recording member fixedly provided on the rotary member and disposed along a circumferential direction of the rotary member, the first magnetic recording member being recorded, at a plurality of positions on an outer periphery of the rotary member in a rotational direction thereof, with a plurality of position magnetic signals, respectively, which are magnetic signals that indicate the positions, respectively; a signal detecting unit disposed at a position facing the first magnetic recording member so as to detect the magnetic signal recorded in the first magnetic recording member; and a position detecting unit configured to detect a position of the movable optical element based on the magnetic signal detected by the signal detecting unit, in which the position magnetic signals are each formed by a magnetic pattern magnetized in the rotational direction, the magnetic pattern indicating an n-bit digital code where n is equal to or more than a natural number of 2, a range in which one of the position magnetic signals is recorded in the first magnetic recording member, has a first width in the rotational direction of the rotary member, the first magnetic recording member is recorded with a range identification magnetic signal between each two adjacent position magnetic signals of the plurality of position magnetic signals to be adjacent to the position magnetic signals, the range identification magnetic signal is a magnetic signal that identifies a range in which the adjacent position magnetic signal is recorded, the range identification magnetic signals are each formed by a magnetic pattern magnetized in the rotational direction, a range in which one of the range identification magnetic signals is recorded, has a second width in the rotational direction, the second width being smaller than the first width, and the position detecting unit detects the position of the movable optical element based on the position magnetic signal which is detected continuously after the range identification magnetic signal is detected.

Another aspect of the present invention provides a position detection method of a movable optical element mounted in a lens device, the method including: a signal detecting step of detecting a magnetic signal from a magnetic recording member which is recorded, at a plurality of positions on an outer periphery of a rotary member, with a plurality of position magnetic signals, respectively, which are magnetic signals indicating the positions, respectively, the magnetic recording member being fixedly provided on the rotary member configured to rotate around an optic axis of the movable optical element depending on a movement of the movable optical element, and extending along a circumferential direction of the rotary member; and a position detecting step of detecting a position of the movable optical element based on the detected magnetic signal, in which the position magnetic signals are each formed by a magnetic pattern magnetized in a rotational direction of the rotary member, the magnetic pattern indicating an n-bit digital code where n is equal to or more than a natural number of 2, a range, in which one of the position magnetic signals is recorded in the first magnetic recording member, has a first width in the rotational direction of the rotary member, the first magnetic recording member is recorded with a range identification magnetic signal between each two adjacent position magnetic signals of the plurality of position magnetic signals to be adjacent to the position magnetic signals, the range identification magnetic signal is a magnetic signal that identifies a range in which the adjacent position magnetic signal is recorded, the range identification magnetic signals are each formed by a magnetic pattern magnetized in the rotational direction, a range, in which one of the range identification magnetic signals is recorded, has a second width in the rotational direction, the second width being smaller than the first width, and the position detecting step detects a position of the movable optical element based on the position magnetic signal which is detected continuously after the range identification magnetic signal is detected.

According to the aspects of the present invention, it is possible to provide a lens device capable of precisely detecting an absolute position of a movable optical element with a low-cost and simple configuration, and a position detection method of a movable optical element.

DESCRIPTION OF EMBODIMENTS

Hereinafter, an exemplary embodiment of the present invention will be described with reference to the drawings.

Figure 1:
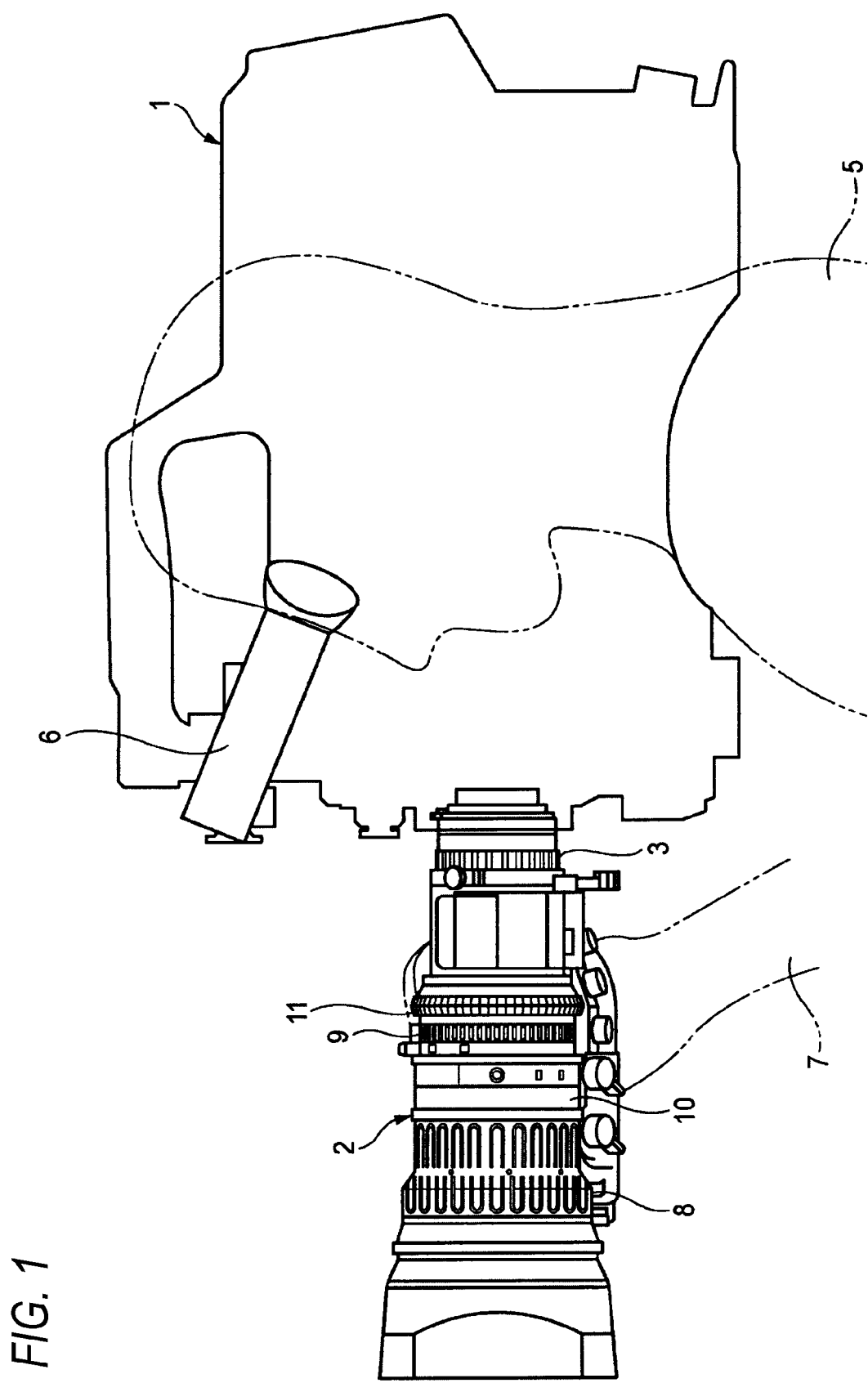
FIG. 1 is an external view of an imaging device equipped with a lens device 2 according to one exemplary embodiment of the present invention.

FIG. 1 is an external view illustrating an imaging device equipped with a lens device 2, according to an exemplary embodiment. The lens device 2 is mounted on a front portion of an imaging device body 1.

The lens device 2 includes a case 10 having a cylindrical shape or the like. An imaging lens such as a zoom lens or a focus lens, and a diaphragm configured to adjust an aperture size may be embedded in the case 10. A base unit of the case 10 of the lens device 2 is provided with a mount unit 3. The lens device 2 is removably mounted on a lens mounting unit provided on the front portion of the imaging device body 1 by a connecting unit of the mount unit 3.

In the imaging device body 1, an imaging element is disposed on an optical axis of the lens device 2 in a state where the lens device 2 is mounted. In addition, the imaging element captures an optical image which is focused by the lens device 2. An output signal of the imaging element is processed by an image processing unit embedded in the imaging device body 1 so that various image data are generated.

A photographer 5 may carry the imaging device body 1 on a right shoulder, and may view a finder device 6, for example, with a right eye. The photographer 5 images a subject while fixing the imaging device by holding a gripping unit of the lens device 2 with a right hand 7.

A focus ring 8, of which the focal position is adjustable when the user manually rotates the focus ring 8 by an optional angle, is provided at a front end side (a subject side) of the lens device 2 to be rotatable on the outer periphery of the lens device 2.

A zoom ring 9, of which the zoom magnification is adjustable when the user manually rotates the zoom ring 9 by an optional angle, is provided in the middle of the lens device 2 to be rotatable on the outer periphery of the lens device 2.

In addition to the zoom ring 9, the lens device 2 is provided, at the imaging device body 1 side, with an iris ring 11 for adjusting an aperture size of the diaphragm device to be rotatable on the outer periphery of the lens device 2.

Figure 2:
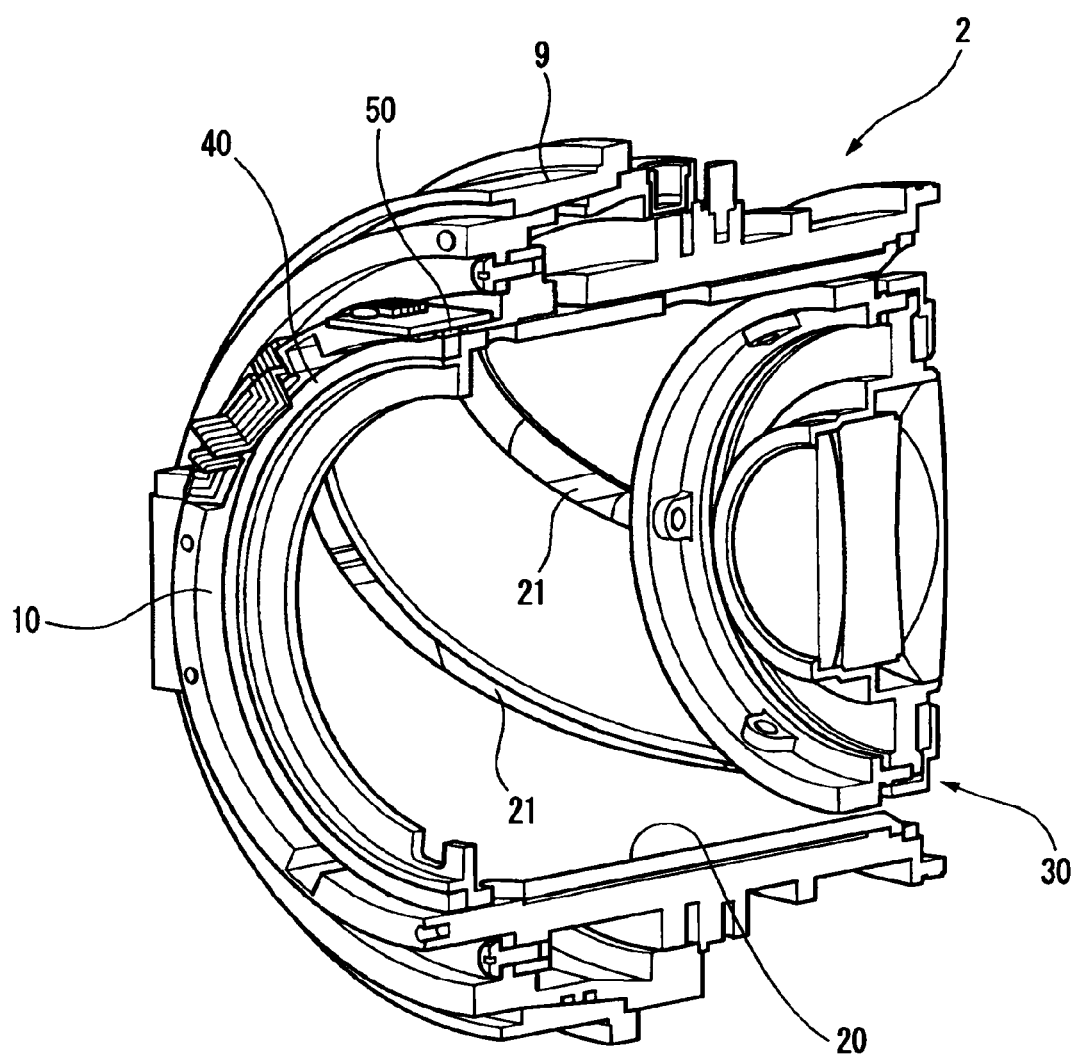
FIG. 2 is a perspective view of the lens device 2 illustrated in FIG. 1 and sectioned in the vicinity of a zoom ring 9.

FIG. 2 is a perspective view of the lens device 2 illustrated in FIG. 1 and sectioned in the vicinity of a zoom ring 9.

Within the case 10 that includes the zoom ring 9 provided on the outer periphery thereof, a rotary tube 20, which is rotatable around the optical axis of the lens device 2, and a zoom lens holding unit 30, which is provided in the rotary tube 20 so as to hold the zoom lens serving as a movable optical element, are provided.

The zoom lens holding unit 30 is configured to be movable in the optical axis direction of the lens device 2 in an interlocking manner with the rotation of the zoom ring 9.

The rotary tube 20 has a cam groove 21 configured to convert a linear motion of the zoom lens holding unit 30 into a rotational motion. A protrusion of the zoom lens holding unit 30 is movably fitted in the cam groove 21 and when the zoom lens holding unit 30 moves in the optical axis direction, the rotary tube 20 rotates around the optical axis depending on the movement of the zoom lens holding unit 30.

On the outer periphery of the rotary tube 20, a magnetic recording scale 40 serving as a magnetic recording member is fixedly disposed, in which the magnetic recording scale 40 is disposed along the circumferential direction (the rotational direction) of the rotary tube 20. While the present exemplary embodiment uses an annular-shaped magnetic recording scale 40, the magnetic recording scale 40 may not have an annular shape, and a linear magnetic recording scale 40 having a length depending on a rotatable angle of the rotary tube 20 may be used.

On the inner surface of the case 10, a magnetic sensor unit 50 is fixedly disposed at a position where the magnetic sensor unit 50 faces the magnetic recording scale 40.

Figure 3:
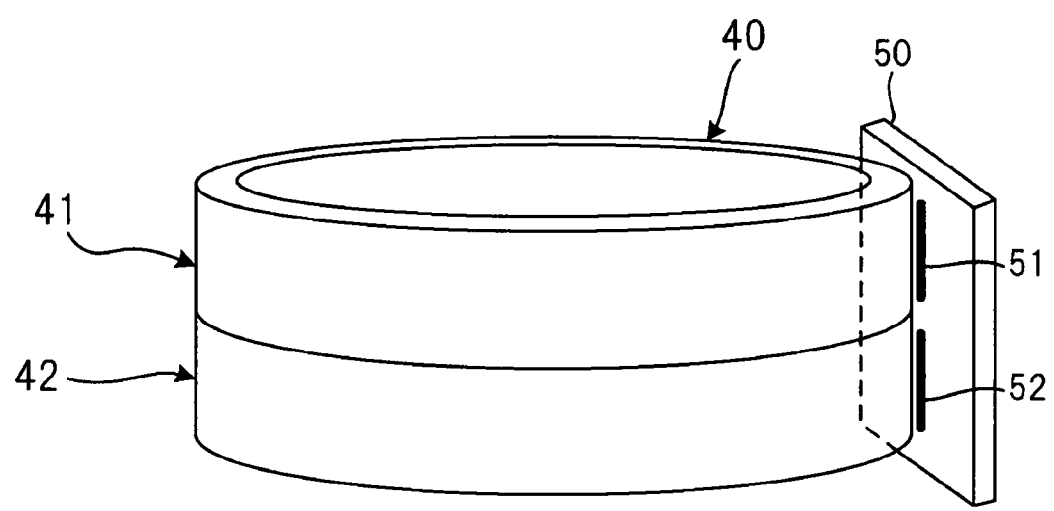
FIG. 3 is a partial enlarged view of a magnetic recording scale 40 illustrated in FIG. 2 and a magnetic sensor unit 50 facing the magnetic recording scale 40.
Figure 4:
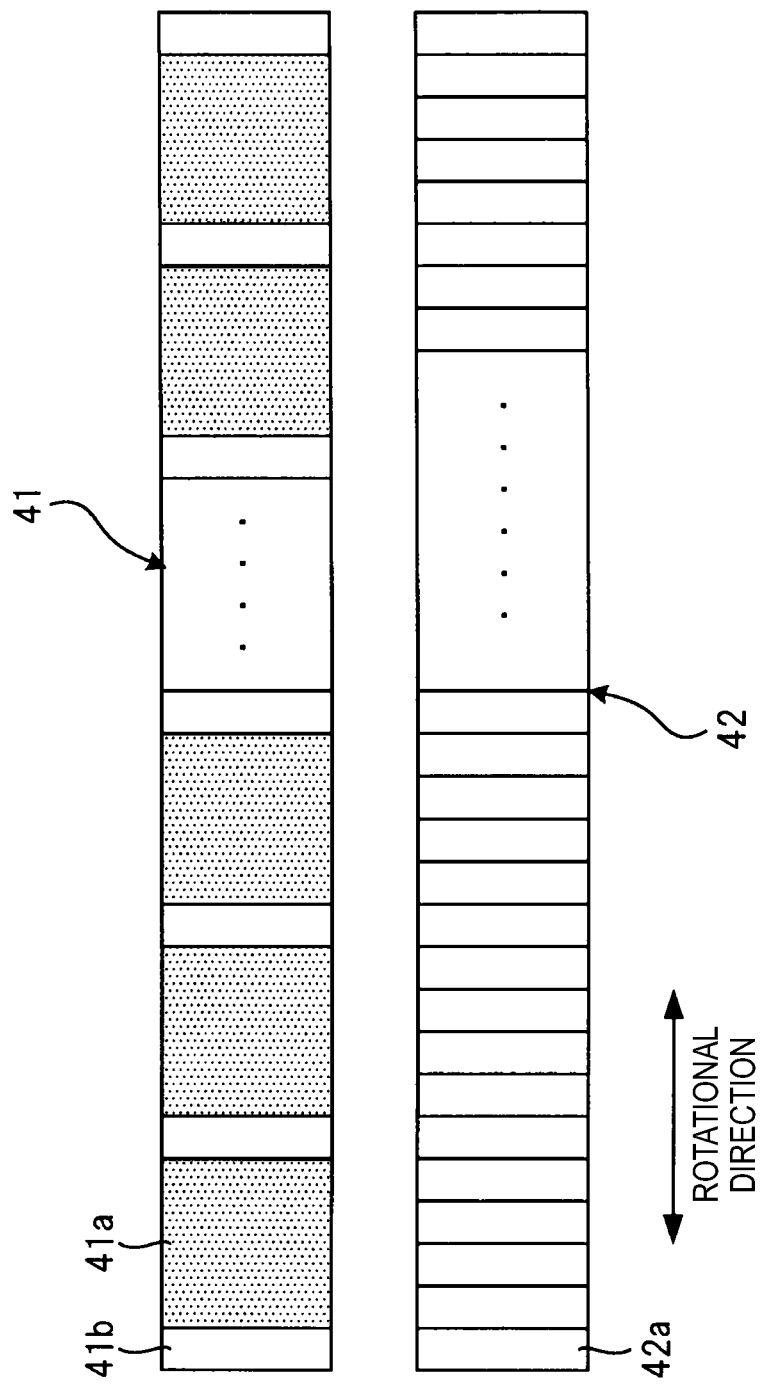
FIG. 4 is a development view of the magnetic recording scale 40 illustrated in FIG. 2.

FIG. 3 is a partial enlarged view of a magnetic recording scale 40 illustrated in FIG. 2 and a magnetic sensor unit 50 facing the magnetic recording scale 40. FIG. 4 is a development view of the magnetic recording scale 40 illustrated in FIG. 2.

As illustrated in FIG. 3, the magnetic recording scale 40 is configured by stacking a magnetic recording scale 41 and a magnetic recording scale 42.

The magnetic recording scale 41 and the magnetic recording scale 42 are recorded with magnetic signals, respectively. The magnetic signals are each constituted with a magnetized pattern having an S-pole and an N-pole.

The magnetic sensor unit 50 includes a magnetic sensor 51 disposed at a position where the magnetic sensor faces the magnetic recording scale 41 and a magnetic sensor 52 disposed at a position where the magnetic sensor 52 faces the magnetic recording scale 42. While the position of the magnetic recording scale 41 facing the magnetic sensor 51 and the position of the magnetic recording scale 42 facing the magnetic sensor 52 correspond to each other in the rotational direction of the rotary tube 20, the positions of the magnetic recording scale 41 and the magnetic recording scale 42 may be deviated from each other.

The magnetic sensor 51 includes a single magnetoresistive element, of which the electric resistance may vary depending on an applied magnetic field. The magnetic sensor 51 detects a magnetic signal recorded on the magnetic recording scale 41, and outputs the detected signal.

The magnetic sensor 52 includes a single magnetoresistive element, of which the electric resistance may vary depending on an applied magnetic field. The magnetic sensor 52 detects a magnetic signal recorded on the magnetic recording scale 42, and outputs the detected signal.

As illustrated in FIG. 4, on the magnetic recording scale 41, a plurality of recording sections 41a are arranged along the rotational direction of the rotary tube 20 to be spaced apart from each other. Further, in the magnetic recording scale 41, recording sections 41b are provided on both sides of each recording section 41a to be adjacent thereto.

The recording sections 41a are provided at positions which correspond to divided regions, respectively, when the outer periphery of the rotary tube 20 is divided into a plurality of regions in the rotational direction of the rotary tube 20. Each recording section 41a is recorded with a position magnetic signal which indicates the position of a divided region corresponding thereto.

The position magnetic signal is composed of a magnetic pattern which represents a 4-bit digital code (0001-1111) and is magnetized in the rotational direction of the rotary tube 20. "1" in the digital code is composed of a magnetized pattern which represents a sine wave signal of one period, and "0" in the digital code is composed of a magnetized pattern which represents a signal of which the amplitude value is zero (0) in the sine wave signal of one period. Further, the number of bits of the digital code is not limited to "4," and a suitable value may be determined according to the detection precision of the rotational position of the rotary tube 20.

Each recording section 41b is recorded with an identification magnetic signal for identifying a recording section 41a adjacent thereto. The recording section 41b has a width smaller than that of the recording section 41a in the rotational direction. The identification magnetic signal is composed of a magnetic pattern magnetized in the rotational direction of the rotary tube 20 (e.g., a magnetic pattern representing a sine wave signal of one period).

The position magnetic signal recorded in the recording section 41a and the identification magnetic signal recorded in the recording section 41b are different from each other in terms of at least one of a magnetic intensity and a magnetization width (a width of each magnetized portion forming a magnetic pattern in the rotational direction) of the magnetic patterns.

On the magnetic recording scale 42, a plurality of recording sections 42a are arranged in a row in the rotational direction.

Each recording section 42a is recorded with an incremental magnetic signal. The incremental magnetic signal is composed of a magnetic pattern magnetized in the rotational direction of the rotary tube 20 (e.g., a magnetic pattern representing a sine wave signal of one period).

Figure 5:
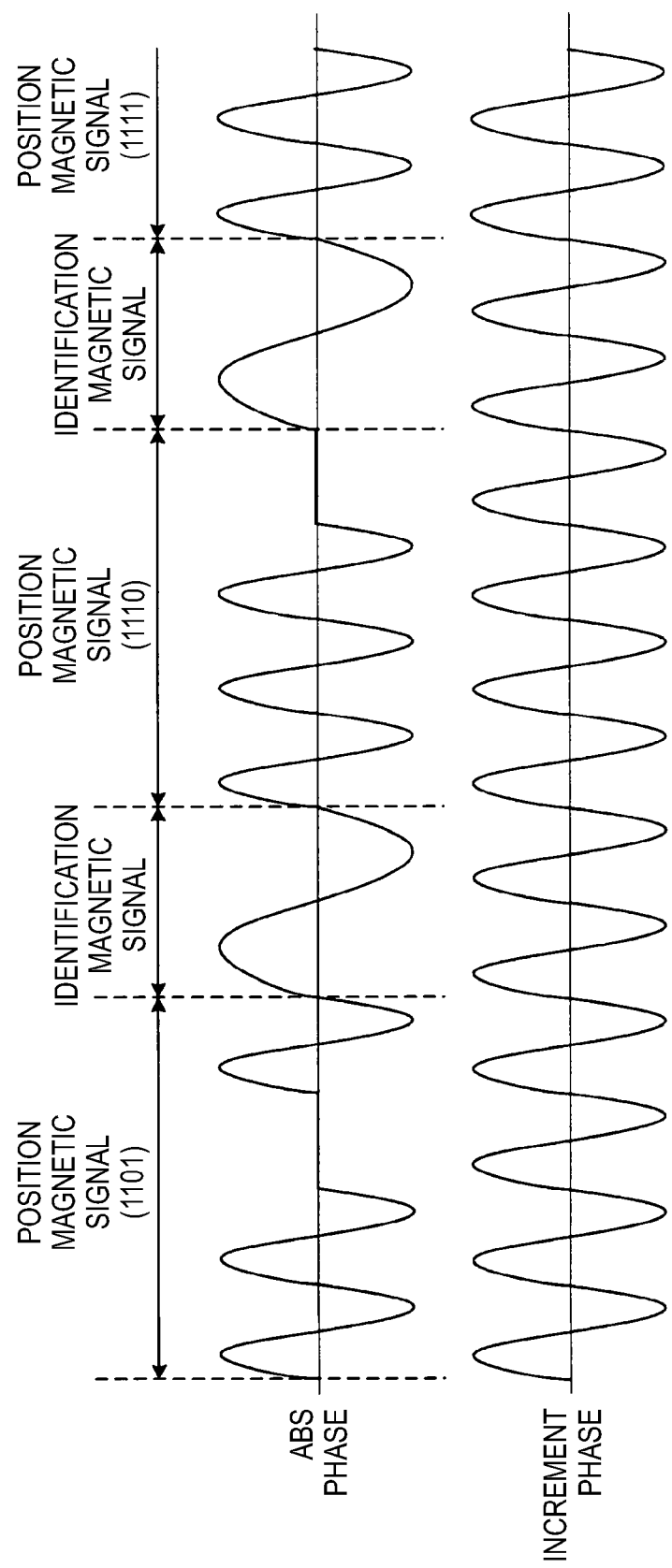
FIG. 5 is a view illustrating an example of a signal (ABS phase) detected by a magnetic sensor 51 and a signal (increment phase) detected by a magnetic sensor 52 when a rotary tube 20 is rotated at a predetermined speed.

FIG. 5 is a view illustrating an example of a signal (ABS phase) detected by the magnetic sensor 51 and a signal (increment phase) detected by the magnetic sensor 52 when the rotary tube 20 is rotated at a predetermined speed.

In the example of FIG. 5, the magnetization width of a magnetic pattern forming an identification magnetic signal recorded in a recording section 41b becomes larger as compared to a magnetic pattern forming a position magnetic signal recorded in a recording section 41a. Accordingly, a wavelength of the sine wave signal detected from the recording sections 41b becomes lengthened as compared to each sine wave signal detected from the recording sections 41a. According to the example of FIG. 5, due to the difference in wavelength, the identification magnetic signal and the position magnetic signal may be distinctly distinguished from each other.

Figure 6:
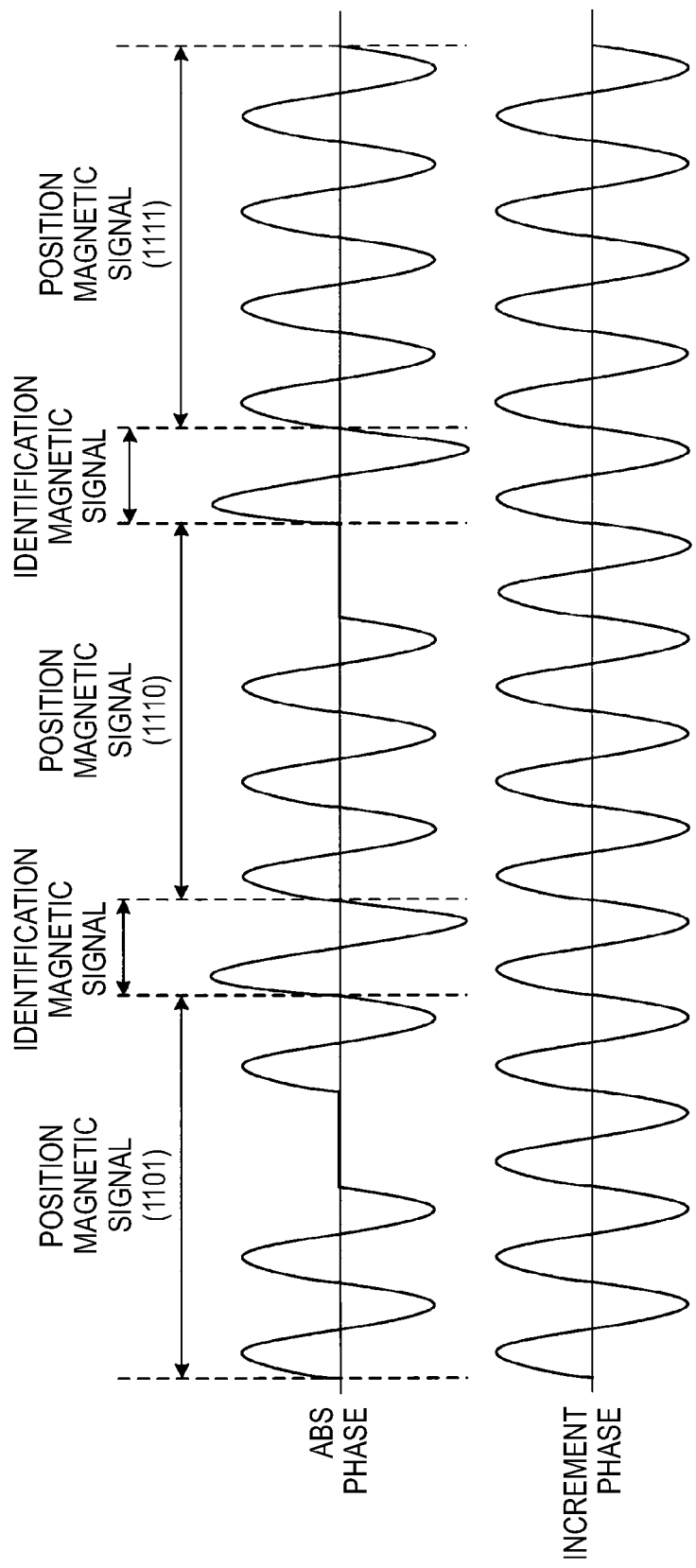
FIG. 6 is a view illustrating another example of a signal (ABS phase) detected by the magnetic sensor 51 and a signal (increment phase) detected by the magnetic sensor 52 when the rotary tube 20 is rotated at a predetermined speed.

FIG. 6 is a view illustrating another example of a signal (ABS phase) detected by the magnetic sensor 51 and a signal (increment phase) detected by the magnetic sensor 52 when the rotary tube 20 is rotated at a predetermined speed.

In the example of FIG. 6, the magnetization width of a magnetic pattern forming a position magnetic signal recorded in a recording section 41a and the magnetization width of a magnetic pattern forming an identification magnetic signal recorded in a recording section 41b are the same. However, the magnetic intensity of the magnetic pattern forming the identification magnetic signal recorded in the recording section 41b become larger than the magnetic intensity of the magnetic pattern forming the position magnetic signal recorded in the recording section 41a. Accordingly, the amplitude of the sine wave signal detected from the recording sections 41b becomes larger as compared to each sine wave signal detected from the recording sections 41a. According to the example of FIG. 6, due to the difference in amplitude, the identification magnetic signal and the position magnetic signal may be distinctly distinguished from each other.

Figure 7:
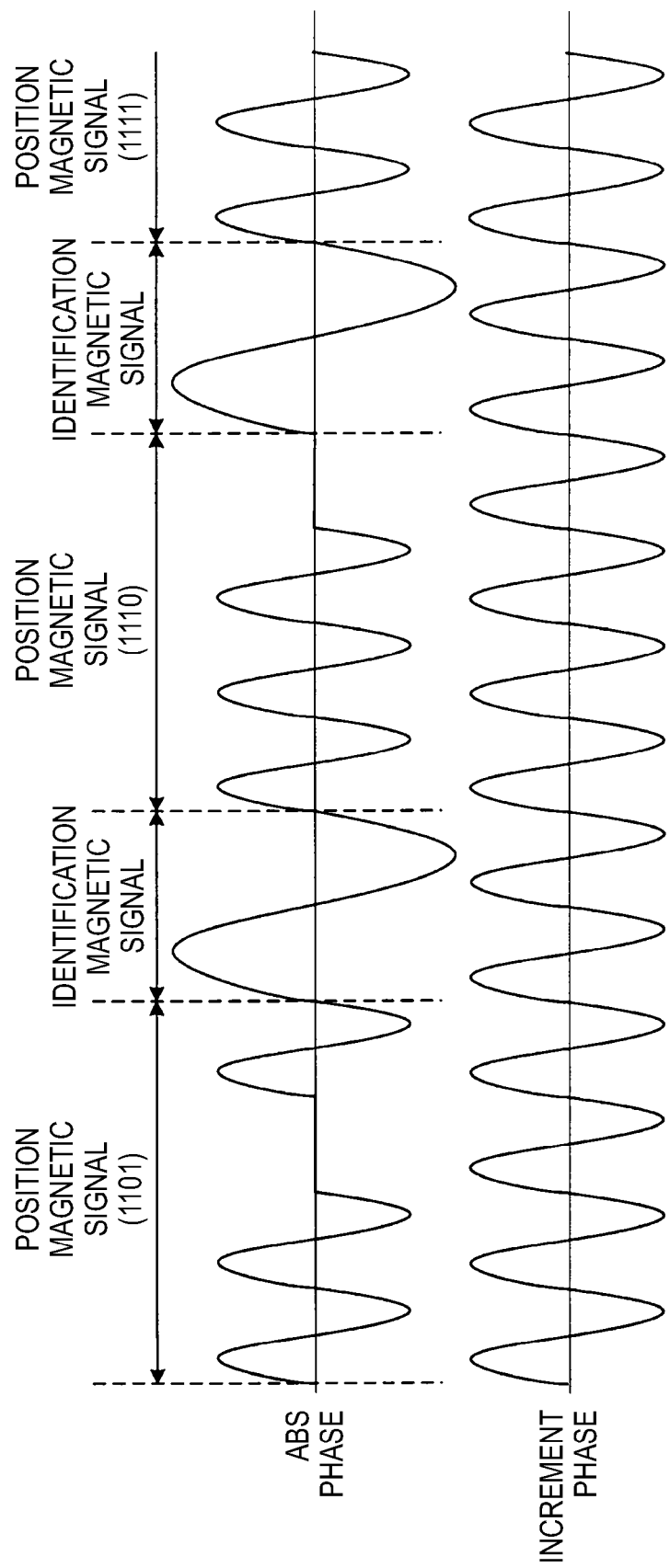
FIG. 7 is a view illustrating still another example of a signal (ABS phase) detected by the magnetic sensor 51 and a signal (increment phase) detected by the magnetic sensor 52 when the rotary tube 20 is rotated at a predetermined speed.

FIG. 7 is a view illustrating still another example of a signal (ABS phase) detected by the magnetic sensor 51 and a signal (increment phase) detected by the magnetic sensor 52 when the rotary tube 20 is rotated at a predetermined speed.

In the example of FIG. 7, the magnetization width of a magnetic pattern forming an identification magnetic signal recorded in a recording section 41b becomes larger than the magnetization width of a magnetic pattern forming a position magnetic signal recorded in a recording section 41a. Further, the magnetic intensity of the magnetic pattern forming the identification magnetic signal recorded in the recording section 41b becomes larger than the magnetic intensity of the magnetic pattern forming the position magnetic signal recorded in the recording section 41a. Accordingly, the wavelength of the sine wave signal detected from the recording section 41b is lengthened and the amplitude of the sign wave signal becomes larger, as compared to each sine wave signal detected from the recording section 41a. According to the example of FIG. 7, due to the difference in wavelength and amplitude, the identification magnetic signal and the position magnetic signal may be distinctly distinguished from each other.

Figure 8:
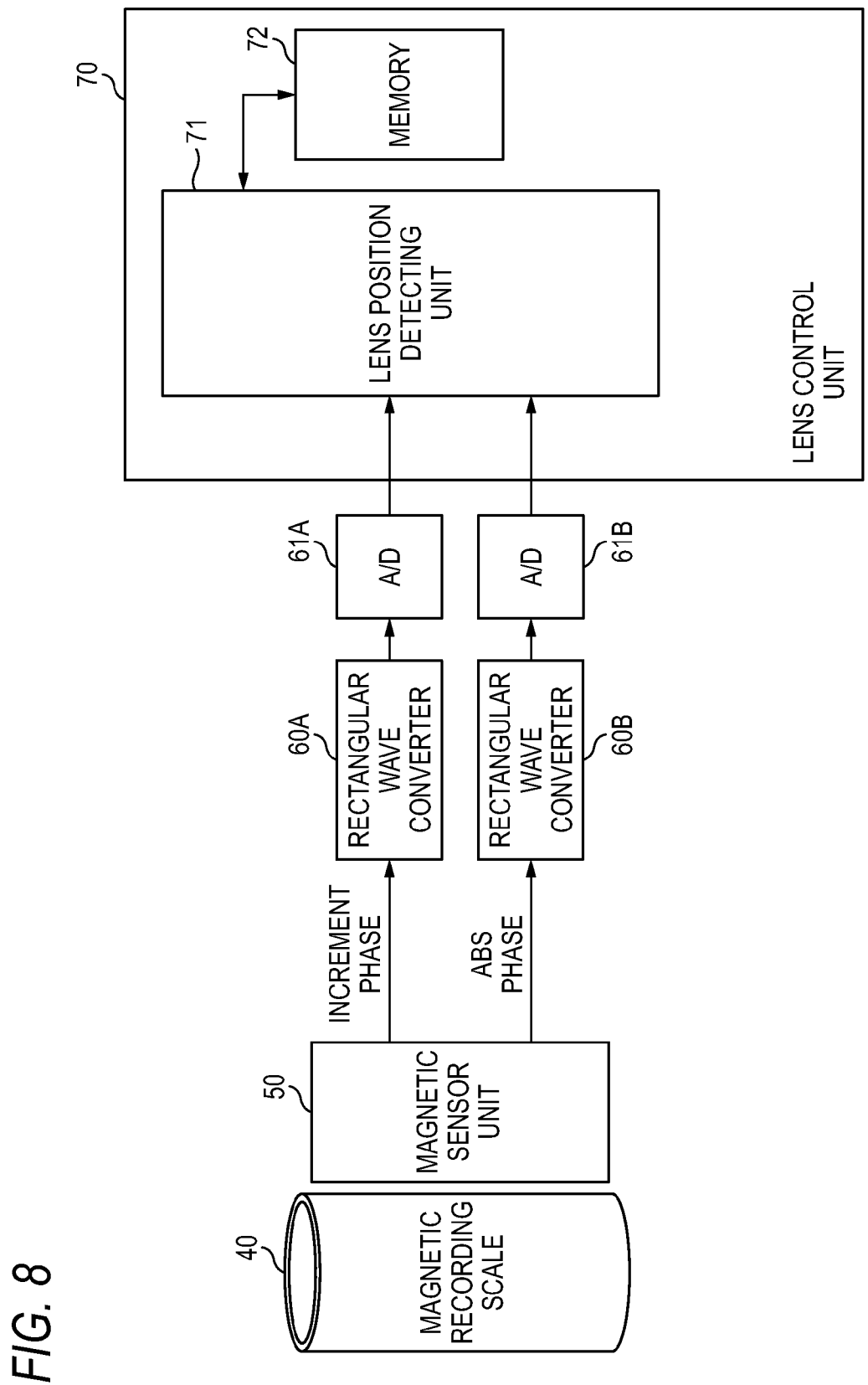
FIG. 8 is a view illustrating functional blocks of the lens device 2 that detect a position of a zoom lens holding unit 30 (a position of a zoom lens) illustrated in FIG. 2.

FIG. 8 is a view illustrating functional blocks of the lens device 2 that detect the position of the zoom lens holding unit 30 (synonymous with the position of the zoom lens) illustrated in FIG. 2.

The lens device 2 is provided with rectangular wave converters 60A and 60B, ND converters 61A and 61B, and a lens control unit 70.

The rectangular wave converter 60A converts a signal output from the magnetic sensor 52 (an incremental signal (increment phase)) into a rectangular wave. The rectangular wave converter 60B converts a signal output from the magnetic sensor 51 (an absolute signal (ABS phase)) into a rectangular wave.

Figure 9:
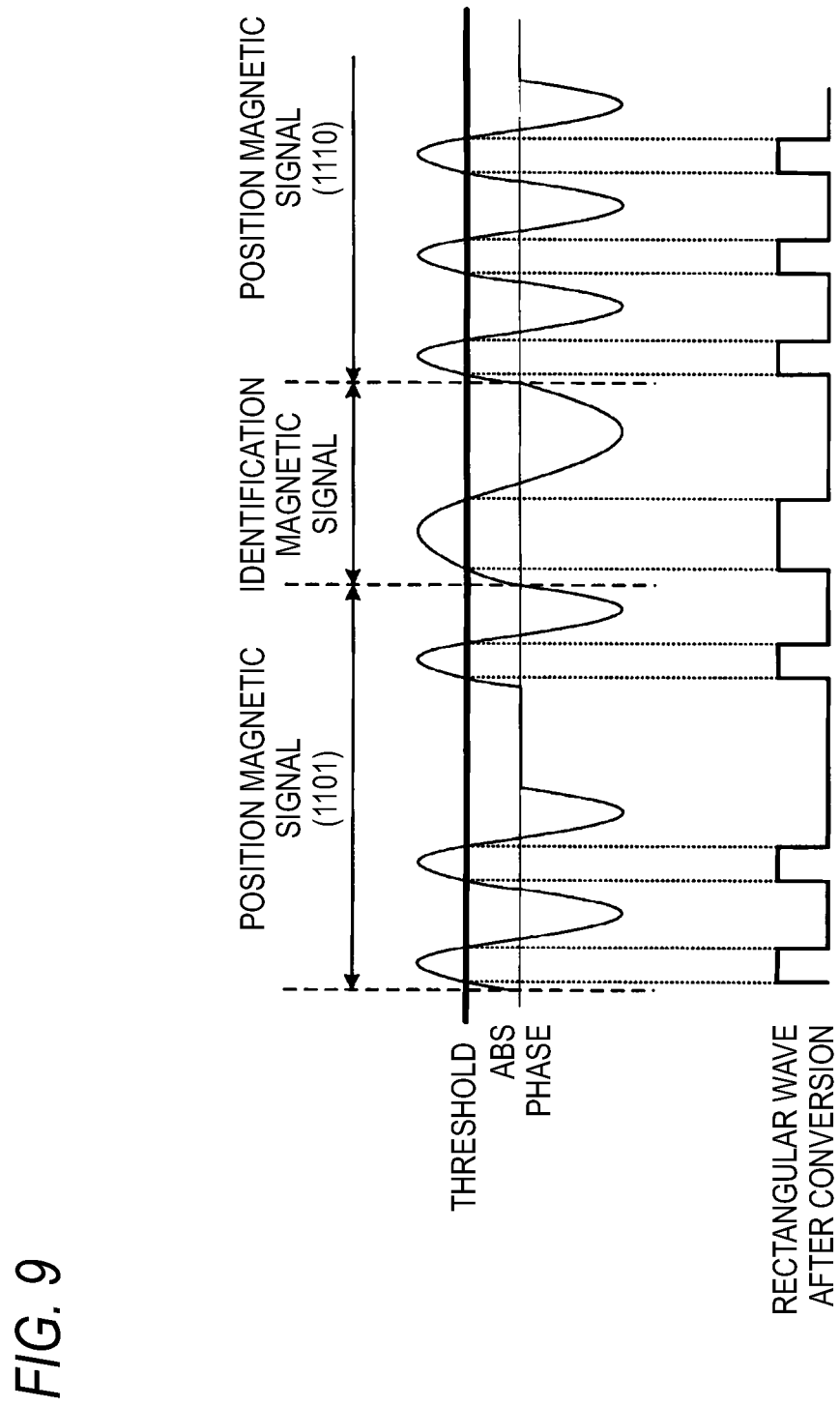
FIG. 9 is a view for describing a performance of a rectangular wave converter.

For example, when a signal as illustrated in FIG. 5 is detected, as illustrated in FIG. 9, a threshold value is set for a positive output value of an ABS phase, and a rectangular wave is generated in which a difference between a peak value of the signal portion and the threshold value in a signal portion larger than the threshold value corresponds to the amplitude of the rectangular and a time between two points where the signal portion and the straight line of the threshold value intersect each other corresponds to the pulse width of the rectangular wave.

The ND converter 61A samples rectangular waves output from the rectangular wave converter 60A at predetermined intervals and converts the rectangular waves into a digital signal. The A/D converter 61B samples rectangular waves output from the rectangular wave converter 60B at predetermined intervals and converts the rectangular waves into a digital signal.

The lens control unit 70 includes a lens position detecting unit 71 that detects the position of the zoom lens, and a memory 72.

The lens control unit 70 is mainly formed of a processor. The lens position detecting unit 71 refers to a functional block implemented when the processor executes a program stored in the memory 72.

When a signal as illustrated FIG. 5 is detected, the lens position detecting unit 71 monitors the pulse width of rectangular waves output from the ND converter 61B, and detects an identification magnetic signal based on whether the pulse width has become a first predetermined value. Thereafter, the lens position detecting unit 71 detects a rectangular wave input from the ND converter 61B as the position magnetic signal, and decodes the digital code indicated by this position magnetic signal, thereby detecting the position of a divided region.

The first predetermined value corresponds to a pulse width value of the rectangular waves detected by the magnetic sensor 51 from a recording section 41b when the rotary tube 20 rotates at a speed (a reference speed) which may be considered in a practical use. The above-mentioned position detection method of a divided region is performed under the assumption that the rotary tube 20 rotates at the reference speed.

The lens position detecting unit 71 counts the number of rectangular waves (the incremental magnetic signal) input from the A/D converter 61A subsequent to the time when the identification magnetic signal has been detected, and determines the detailed positions of the portions facing the magnetic sensors 51 and 52 within the divided region specified at the detected position. The relationship between the detailed position in each divided region and the position of the zoom lens is known in advance. Accordingly, the lens position detecting unit 71 detects, based on the detailed positions, an absolute position of the zoom lens which corresponds to the detailed positions.

When a signal as illustrated in FIG. 6 is detected, the lens position detecting unit 71 monitors the pulse width of rectangular waves output from the A/D converter 61, and detects the identification magnetic signal based on whether the pulse width has become a second predetermined value. Thereafter, the lens position detecting unit 71 detects a rectangular wave input from the A/D converter 61B as the position magnetic signal, and decodes the digital code indicated by this position magnetic signal, thereby detecting the position of a divided region. The subsequent operations are the same as those described above.

The second predetermined value is the amplitude value of the rectangular waves detected by the magnetic sensor 51 in the recording sections 41b when the rotary tube 20 rotates at the reference speed.

When a signal as illustrated in FIG. 7 is detected, the lens position detecting unit 71 monitors the amplitude and the pulse width of rectangular waves output from the A/D converter 61B, and detects the identification magnetic signal based on whether the pulse width has become the first predetermined value and the amplitude has become the second predetermined value. Thereafter, the lens position detects a rectangular wave from the A/D converter 61B as the position magnetic signal, and decodes the digital code indicated by the position magnetic signal so as to detect the position of a divided region. The subsequent operations are the same as those described hereinabove.

As described above, since the recording sections 41b are provided before and after a recording section 41a in the magnetic recording scale 41, the lens device 2 may detect a magnetic signal recorded in a recording section 41b so as to determine a detection start timing of a magnetic signal (a code indicating a position of a divided region) in a recording section 41a adjacent to the recording section 41b. Further, the width of the recording section 41b in the rotational direction is smaller than the width of the recording section 41a in the rotational direction, and a region not recorded with a magnetic signal (a non-magnetized region) does not exist between the recording section 41b and the recording section 41a. For this reason, the position of the zoom lens may be detected only with a small amount of rotation so that the operability until the position detection of the zoom lens may be improved.

While the number of sine wave signals recorded in the recording section 41b is one in the above, the number may be two or more. When the number of sine wave signals is less than the number of bits of the digital code recorded in the recording section 41a, the detection of the identification magnetic signal may be performed at a high speed. In particular, as illustrated in FIGS. 5 to 7, when the number of sine wave signals recorded in the recording section 41b is one of the minimum, the detection of the lens position can be performed at the highest speed, and thus operability can be improved.

Further, the magnetization width of the magnetic signal recorded in the recording section 41b may be smaller than the magnetization width of the magnetic signal recorded in the recording section 41a. Even in such a case, the identification magnetic signal and the position magnetic signal may also be distinctly distinguished from each other. In this case, since the width of the recording section 41b may be narrowed, the detection of the lens position can be performed at a higher speed.

Further, even if the magnetic intensity of the magnetic signal recorded in the recording section 41b is smaller than the magnetic intensity of the magnetic signal recorded in the recording section 41a, the identification magnetic signal and the position magnetic signal may also be distinctly distinguished from each other.

In the foregoing description, at least one of the magnetic intensity and the magnetization width of the magnetic signal recorded in the recording section 41b is set to be different from that of the magnetic signal recorded in the recording section 41a. However, the magnetic intensity and the magnetization width of the magnetic signal recorded in the recording section 41b may be set to be the same as those of the magnetic signal recorded in the recording section 41a.

Figure 10:
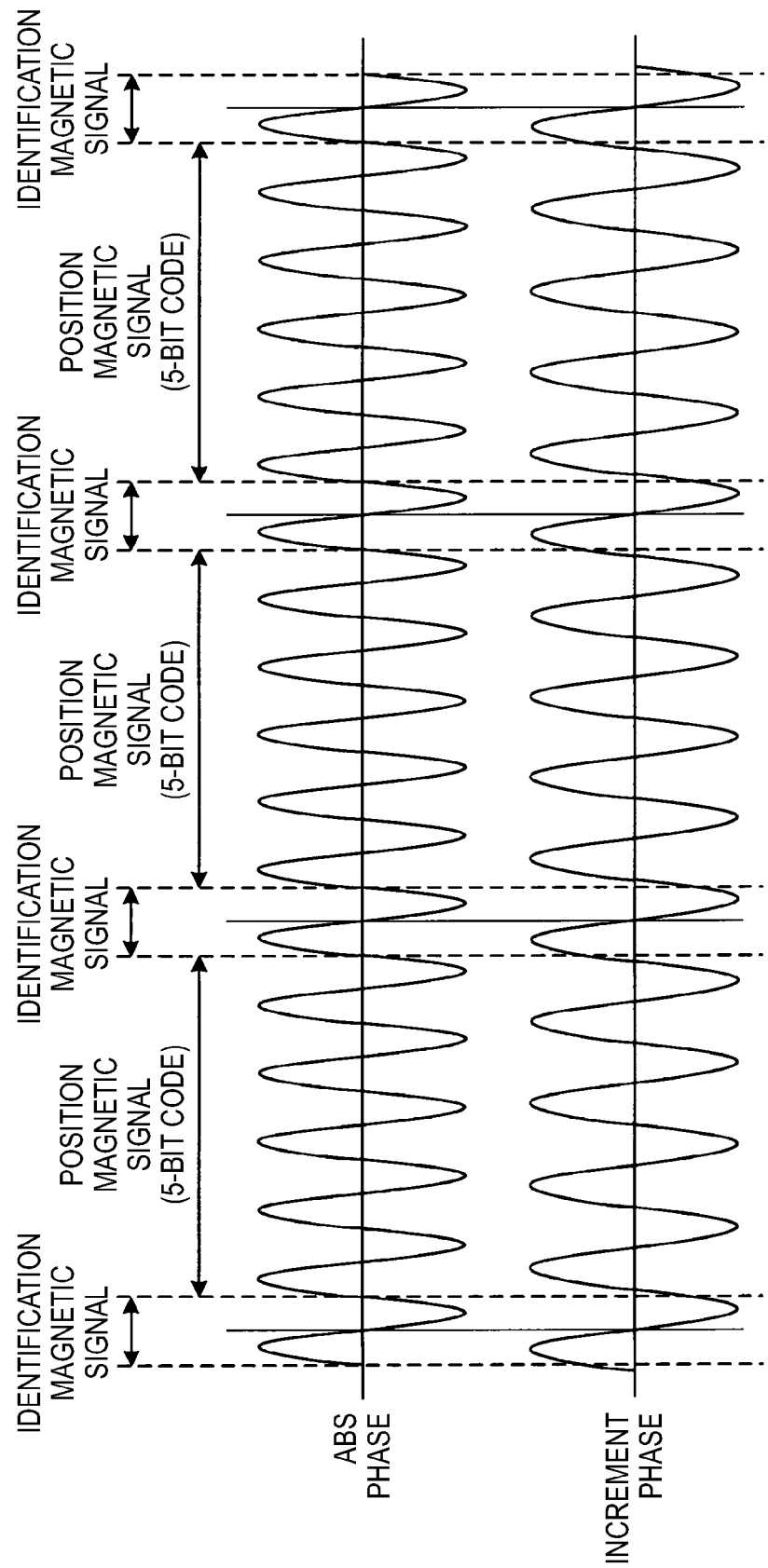
FIG. 10 is a view illustrating yet another example of a signal (ABS phase) detected by the magnetic sensor 51 and a signal (increment phase) detected by the magnetic sensor 52 when the rotary tube 20 is rotated at a predetermined speed.

FIG. 10 is a view illustrating yet another example of a signal (ABS phase) detected by the magnetic sensor 51 and a signal (increment phase) detected by the magnetic sensor 52 when the rotary tube 20 is rotated at a predetermined speed. In FIG. 10, a 5-bit digital code is provided as the position magnetic signal to be recorded in the recording section 41a. FIG. 10 illustrates all the digital codes recorded in the recording section 41a as (11111) for the purpose of description.

In the example of FIG. 10, the magnetic intensity and the magnetization width of the magnetic signal recorded in the recording sections 41b are set to be the same as the magnetization width and the magnetic intensity of the magnetic signal recorded in the recording sections 41a. Further, the incremental magnetic signal recorded in the magnetic recording scale 42 has a portion of which the phase only corresponds to the phase of the identification magnetic signal recorded in the recording section 41b. In other words, the incremental position magnetic signal recorded in the recording section 42b and the position magnetic signal recorded in the recording section 41a are not equal to each other in terms of phase at any position.

Accordingly, the lens position detecting unit 71 monitors rectangular waves input from the A/D converter 61A and rectangular waves input from the ND converter 61B, and detects the identification magnetic signal based on whether the respective rectangular waves are in the same phase (rise timings or falling timings of the rectangular waves correspond to each other). Then, based on a rectangular wave input from the ND converter 61B after detecting the identification magnetic signal, the lens position detecting unit 71 decodes the digital code, thereby detecting the position of a divided region. The subsequent operations are the same as those described hereinabove.

As described above, even by recording the magnetic signal illustrated in FIG. 10 in the magnetic recording scale 40, the detection start time of the magnetic signal (a code indicating the position of the divided region) of the recording section 41a may be determined with a small amount of rotation.

Hereinabove, the zoom lens has been exemplified as the movable optical element mounted in the lens device 2. However, the technique described in the present exemplary embodiment may also be applicable to other movable optical elements such as a focus lens or a diaphragm.

As set forth above, the present specification discloses the following matter.

It is disclosed a lens device having a movable optical element, the lens device comprising: a rotary member configured to rotate around an optic axis of the movable optical element depending on a movement of the movable optical element; a first magnetic recording member fixedly provided on the rotary member and disposed along a circumferential direction of the rotary member, the first magnetic recording member being recorded, at a plurality of positions on an outer periphery of the rotary member in a rotational direction thereof, with a plurality of position magnetic signals, respectively, which are magnetic signals that indicate the positions, respectively; a signal detecting unit disposed at a position facing the first magnetic recording member so as to detect the magnetic signal recorded in the first magnetic recording member; and a position detecting unit configured to detect a position of the movable optical element based on the magnetic signal detected by the signal detecting unit, wherein the position magnetic signals are each formed by a magnetic pattern magnetized in the rotational direction, the magnetic pattern indicating an n-bit digital code where n is equal to or more than a natural number of 2, a range in which one of the position magnetic signals is recorded in the first magnetic recording member, has a first width in the rotational direction of the rotary member, the first magnetic recording member is recorded with a range identification magnetic signal between each two adjacent position magnetic signals of the plurality of position magnetic signals to be adjacent to the position magnetic signals, the range identification magnetic signal is a magnetic signal that identifies a range in which the adjacent position magnetic signal is recorded, the range identification magnetic signals are each formed by a magnetic pattern magnetized in the rotational direction, a range in which one of the range identification magnetic signals is recorded, has a second width in the rotational direction, the second width being smaller than the first width, and the position detecting unit detects the position of the movable optical element based on the position magnetic signal which is detected continuously after the range identification magnetic signal is detected.

In the disclosed lens device, a magnetic intensity of the magnetic pattern forming the range identification magnetic signal differs from a magnetic intensity of the magnetic pattern forming the position magnetic signal.

In the disclosed lens device, a magnetization width of the magnetic pattern forming the range identification magnetic signal differs from a magnetization width of the magnetic pattern forming the position magnetic signal.

The disclosed lens device further includes: a second magnetic recording member fixed to the rotary member and disposed along the circumferential direction of the rotary member, the second magnetic recording member being recorded with an incremental magnetic signal, wherein the signal detecting unit is disposed to face both the first magnetic recording member and the second magnetic recording member and configured to detect magnetic signals recorded in each of the first magnetic recording member and the second magnetic recording member, the magnetic signals recorded in the second magnetic recording member have a component, of which a phase corresponds to a phase of the range identification magnetic signals, while not having a component, of which a phase corresponds to a phase of the position magnetic signals, and the position detecting unit detects the range identification magnetic signal based on whether the signal detected from the first magnetic recording member and the signal detected form the second magnetic recording member become equal to each other in terms of phase, and detects the position of the movable optical element based on the incremental magnetic signal detected at the time of the range identification signal being detected and the position magnetic signal continuously detected after the range identification magnetic signal is detected.

In the disclosed lens device, the range identification magnetic signal is a signal of m periods where m is equal to or more than a natural number of 1 and is less than n.

In the disclosed lens device, m is equal to 1.

It is disclosed a position detection method of a movable optical element mounted in a lens device, the method comprising: a signal detecting step of detecting a magnetic signal from a magnetic recording member which is recorded, at a plurality of positions on an outer periphery of a rotary member, with a plurality of position magnetic signals, respectively, which are magnetic signals indicating the positions, respectively, the magnetic recording member being fixedly provided on the rotary member configured to rotate around an optic axis of the movable optical element depending on a movement of the movable optical element, and extending along a circumferential direction of the rotary member; and a position detecting step of detecting a position of the movable optical element based on the detected magnetic signal, wherein the position magnetic signals are each formed by a magnetic pattern magnetized in a rotational direction of the rotary member, the magnetic pattern indicating an n-bit digital code where n is equal to or more than a natural number of 2, a range, in which one of the position magnetic signals is recorded in the first magnetic recording member, has a first width in the rotational direction of the rotary member, the first magnetic recording member is recorded with a range identification magnetic signal between each two adjacent position magnetic signals of the plurality of position magnetic signals to be adjacent to the position magnetic signals, the range identification magnetic signal is a magnetic signal that identifies a range in which the adjacent position magnetic signal is recorded, the range identification magnetic signals are each formed by a magnetic pattern magnetized in the rotational direction, a range, in which one of the range identification magnetic signals is recorded, has a second width in the rotational direction, the second width being smaller than the first width, and the position detecting step detects a position of the movable optical element based on the position magnetic signal which is detected continuously after the range identification magnetic signal is detected.

The disclosed matter is applied to, in particular, a business purpose television camera or the like so as to enhance convenience and to be efficient.

Although the present invention has been described above by a specific exemplary embodiment, the present invention is not limited to the exemplary embodiment, and various modifications may be made without departing from a technical spirit of the invention disclosed herein.

What is claimed is:

1. A lens device having a movable optical element, the lens device comprising:
    a rotary member configured to rotate around an optic axis of the movable optical element depending on a movement of the movable optical element;
    a magnetic recording member fixedly provided on the rotary member and disposed along a circumferential direction of the rotary member, the magnetic recording member being recorded, at a plurality of positions on an outer periphery of the rotary member in a rotational direction thereof, with a plurality of position magnetic signals, respectively, which are magnetic signals that indicate the positions, respectively;
    a signal detecting unit disposed at a position facing the magnetic recording member so as to detect the magnetic signal recorded in the magnetic recording member; and
    a position detecting unit configured to detect a position of the movable optical element based on the magnetic signal detected by the signal detecting unit,
    wherein the position magnetic signals are each formed by a magnetic pattern magnetized in the rotational direction, the magnetic pattern indicating an n-bit digital code where n is equal to or more than a natural number of 2,
    a range in which one of the position magnetic signals is recorded in the magnetic recording member, has a first width in the rotational direction of the rotary member,
    the magnetic recording member is recorded with a range identification magnetic signal between each two adjacent position magnetic signals of the plurality of position magnetic signals to be adjacent to the position magnetic signals,
    the range identification magnetic signal is a magnetic signal that identifies a range in which the adjacent position magnetic signal is recorded,
    the range identification magnetic signals are each formed by a magnetic pattern magnetized in the rotational direction,
    a range in which one of the range identification magnetic signals is recorded, has a second width in the rotational direction, the second width being smaller than the first width,
    the position detecting unit detects the position of the movable optical element based on the position magnetic signal which is detected continuously after the range identification magnetic signal is detected, and
    a magnetic intensity of the magnetic pattern forming the range identification magnetic signal differs from a magnetic intensity of the magnetic pattern forming the position magnetic signal.

2. The lens device of claim 1, wherein a magnetization width of the magnetic pattern forming the range identification magnetic signal differs from a magnetization width of the magnetic pattern forming the position magnetic signal.

3. A lens device having a movable optical element, the lens device comprising:
    a rotary member configured to rotate around an optic axis of the movable optical element depending on a movement of the movable optical element;
    a magnetic recording member fixedly provided on the rotary member and disposed along a circumferential direction of the rotary member, the magnetic recording member being recorded, at a plurality of positions on an outer periphery of the rotary member in a rotational direction thereof, with a plurality of position magnetic signals, respectively, which are magnetic signals that indicate the positions, respectively;

a signal detecting unit disposed at a position facing the magnetic recording member so as to detect the magnetic signal recorded in the magnetic recording member; and a position detecting unit configured to detect a position of the movable optical element based on the magnetic signal detected by the signal detecting unit, wherein the position magnetic signals are each formed by a magnetic pattern magnetized in the rotational direction, the magnetic pattern indicating an n-bit digital code where n is equal to or more than a natural number of 2, a range in which one of the position magnetic signals is recorded in the magnetic recording member, has a first width in the rotational direction of the rotary member, the magnetic recording member is recorded with a range identification magnetic signal between each two adjacent position magnetic signals of the plurality of position magnetic signals to be adjacent to the position magnetic signals, the range identification magnetic signal is a magnetic signal that identifies a range in which the adjacent position magnetic signal is recorded, the range identification magnetic signals are each formed by a magnetic pattern magnetized in the rotational direction, a range in which one of the range identification magnetic signals is recorded, has a second width in the rotational direction, the second width being smaller than the first width, the position detecting unit detects the position of the movable optical element based on the position magnetic signal which is detected continuously after the range identification magnetic signal is detected, and a magnetization width of the magnetic pattern forming the range identification magnetic signal differs from a magnetization width of the magnetic pattern forming the position magnetic signal.

4. The lens device of claim 1, wherein the range identification magnetic signal is a signal of m periods where m is equal to or more than a natural number of 1 and is less than n.

5. The lens device of claim 4, wherein m is equal to 1.

6. The lens device of claim 3, wherein the range identification magnetic signal is a signal of m periods where m is equal to or more than a natural number of 1 and is less than n.

7. The lens device of claim 6, wherein m is equal to 1.

8. A position detection method of a movable optical element mounted in a lens device, the method comprising:

a signal detecting step of detecting a magnetic signal from a magnetic recording member which is recorded, at a plurality of positions on an outer periphery of a rotary member, with a plurality of position magnetic signals, respectively, which are magnetic signals indicating the positions, respectively, the magnetic recording member being fixedly provided on the rotary member configured to rotate around an optic axis of the movable optical element depending on a movement of the movable optical element, and extending along a circumferential direction of the rotary member; and a position detecting step of detecting a position of the movable optical element based on the detected magnetic signal, wherein the position magnetic signals are each formed by a magnetic pattern magnetized in a rotational direction of the rotary member, the magnetic pattern indicating an n-bit digital code where n is equal to or more than a natural number of 2, a range, in which one of the position magnetic signals is recorded in the magnetic recording member, has a first width in the rotational direction of the rotary member, the magnetic recording member is recorded with a range identification magnetic signal between each two adjacent position magnetic signals of the plurality of position magnetic signals to be adjacent to the position magnetic signals, the range identification magnetic signal is a magnetic signal that identifies a range in which the adjacent position magnetic signal is recorded, the range identification magnetic signals are each formed by a magnetic pattern magnetized in the rotational direction, a magnetic intensity of the magnetic pattern forming the range identification magnetic signal differs from a magnetic intensity of the magnetic pattern forming the position magnetic signal, a range, in which one of the range identification magnetic signals is recorded, has a second width in the rotational direction, the second width being smaller than the first width, and the position detecting step detects a position of the movable optical element based on the position magnetic signal which is detected continuously after the range identification magnetic signal is detected.

9. A position detection method of a movable optical element mounted in a lens device, the method comprising:

a signal detecting step of detecting a magnetic signal from a magnetic recording member which is recorded, at a plurality of positions on an outer periphery of a rotary member, with a plurality of position magnetic signals, respectively, which are magnetic signals indicating the positions, respectively, the magnetic recording member being fixedly provided on the rotary member configured to rotate around an optic axis of the movable optical element depending on a movement of the movable optical element, and extending along a circumferential direction of the rotary member; and a position detecting step of detecting a position of the movable optical element based on the detected magnetic signal, wherein the position magnetic signals are each formed by a magnetic pattern magnetized in a rotational direction of the rotary member, the magnetic pattern indicating an n-bit digital code where n is equal to or more than a natural number of 2, a range, in which one of the position magnetic signals is recorded in the magnetic recording member, has a first width in the rotational direction of the rotary member, the magnetic recording member is recorded with a range identification magnetic signal between each two adjacent position magnetic signals of the plurality of position magnetic signals to be adjacent to the position magnetic signals, the range identification magnetic signal is a magnetic signal that identifies a range in which the adjacent position magnetic signal is recorded, the range identification magnetic signals are each formed by a magnetic pattern magnetized in the rotational direction, a magnetization width of the magnetic pattern forming the range identification magnetic signal differs from a magnetization width of the magnetic pattern forming the position magnetic signal, a range, in which one of the range identification magnetic signals is recorded, has a second width in the rotational direction, the second width being smaller than the first width, and the position detecting step detects a position of the movable optical element based on the position magnetic signal which is detected continuously after the range identification magnetic signal is detected.

* * * * *